(12) United States Patent
Ernst

(10) Patent No.: US 6,419,441 B1
(45) Date of Patent: Jul. 16, 2002

(54) LAMINATION DISPENSER AND METHOD OF DISPENSING LAMINATIONS

(75) Inventor: Lee M. Ernst, Amboy, IL (US)

(73) Assignee: Eagle Automation, Sterling, IL (US)

( * ) Notice: Subject to any disclaimer, the term of this patent is extended or adjusted under 35 U.S.C. 154(b) by 0 days.

(21) Appl. No.: 09/611,487

(22) Filed: Jul. 7, 2000

(51) Int. Cl.[7] .............................................. B65G 59/06
(52) U.S. Cl. .............................. 414/797.9; 414/796.1; 414/797.4; 221/296
(58) Field of Search ........................ 414/797.9, 796.1, 414/797.4, 797.8; 221/224, 225, 238, 255, 268, 296, 298

(56) References Cited

U.S. PATENT DOCUMENTS

| 3,423,814 A | * | 1/1969 | Davis ........................... 29/203 |
| 3,915,317 A | * | 10/1975 | White et al. ............. 414/797.9 |
| 4,049,130 A | * | 9/1977 | Bell ........................... 414/797.9 |
| 4,439,100 A | * | 3/1984 | Fitchner et al. .......... 414/797.9 |
| 4,735,713 A |   | 4/1988 | Ball ............................. 221/13 |

* cited by examiner

Primary Examiner—Christopher P Ellis
Assistant Examiner—Khoi H. Tran
(74) Attorney, Agent, or Firm—Greer, Burns & Crain, Ltd.

(57) ABSTRACT

A lamination dispenser is provided for dispensing a predetermined stack of laminations from a string of laminations. Each lamination has an outer edge with a first area of the outer edge opposing a second area of the outer edge. A third area of the outer edge is perpendicular to the first and second areas of the outer edge. The dispenser also has an ejector for removing the predetermined stack of laminations from the stack by pressing against the third areas of the predetermined stack of laminations. A retainer mechanism is provided for the dispenser for exerting pressure against the outer edge of at least one lamination adjacent the predetermined stack of laminations while the ejector moves the predetermined stack of laminations. The pressure is sufficient to secure at least the adjacent lamination in place.

7 Claims, 7 Drawing Sheets

US 6,419,441 B1

LAMINATION DISPENSER AND METHOD OF DISPENSING LAMINATIONS

BACKGROUND

The present invention relates generally to a method for dispensing laminations of many different shapes and sizes (i.e, E & I lams, motor lams, LTL ballast lams, etc.), as well as to a lamination dispensing apparatus, and more particularly to a more efficient apparatus that dispenses a predetermined stack (amount) of laminations from a string (supply stack) of laminations. Typically, the dispensed laminations will be used for forming the core of a transformer.

Known lamination dispensing machines are used in a process to form conventional transformers with a bobbin that holds a wire coil and terminals, which are secured to a core. The core is typically formed in two parts, with each part being formed by using a stack of a predetermined amount of flat laminations. In some conventional cores, an E-shaped part containing a stack of E-shaped laminations (hereinafter "E-lams") is mated with an I-shaped part containing a stack of straight bar laminations (hereinafter "I-lams") to complete the core. Prior to joining the E-lams and the I-lams, the center bar of the E-shaped part is extended through an aperture in the center of the bobbin. Then, the I-shaped part is welded in two places from the top and bottom distal ends of the E-shaped part, thereby securing the bobbin to the core.

In the conventional lamination dispensing process, a string (supply stack) of commonly shaped laminations are received by a dispenser which is used to count or measure and remove a predetermined stack (amount) of laminations from a string (supply stack) of laminations, where the predetermined stack of laminations removed corresponds to the height of the core. Removing the predetermined stack of laminations is accomplished by moving the string into a position to engage a reciprocating block, or other member, that abuts only the predetermined stack of laminations to thereby remove them from the string. A bar or pressing arm attached to an actuator and the block engages an edge of the laminations, and thrusts the predetermined stack of laminations away from the string. This separated stack of laminations is then moved either by hand or by machine to a location to be assembled with the bobbin and the other half of the core.

In this conventional dispensing machine, however, the friction between the laminations in the stack and the remainder of the string causes the laminations that remain in the string to fan out (instead of maintaining a perfectly aligned separation) when the stack is being moved. Specifically, the uppermost lamination that is being moved by the block is in contact with the lowermost lamination of the remainder of the stack (which is intended to remain stationary). The friction between the surfaces of the moving lamination and the remaining "stationary" lamination causes the "stationary" lamination to move slightly in the direction of the motion of the block. This can start a chain reaction that moves other laminations in the remainder of the string, causing the fanning out of these laminations.

Once the laminations are fanned out, moving the stack into position to be separated from the string, or moving the block to press against the stack, either causes the machine to become jammed or causes the incorrect amount of laminations to be moved. The time taken to unjam the machine lowers productivity, and the incorrect amount of laminations in a core reduces the quality of the transformer and/or raises expenses.

Thus, it is an object of the present invention to provide an improved lamination dispensing machine that raises productivity and provides a product of high quality.

More specifically, an object of the present invention is to provide an improved lamination dispensing machine that prevents jamming of laminations, and more consistently dispenses the correct amount of laminations.

An additional object of the present invention is to provide an improved lamination dispensing machine, as well as an improved method of dispensing laminations, that prevents fanning out of the laminations in a string while a predetermined stack of laminations are being removed from the string.

These and other objects of the present invention are discussed, or will be apparent, from the following detailed description of the invention.

SUMMARY OF THE INVENTION

In keeping with one aspect of the invention, a lamination dispenser is provided for dispensing a predetermined stack (amount) of laminations from a string (supply stack) of laminations. Each lamination has an outer edge with a first area of the outer edge opposing a second area of the outer edge. A third area of the outer edge is perpendicular to the first and second areas of the outer edge. The dispenser also comprises an ejector for removing the predetermined stack of laminations from the stack by pressing against the third areas of the predetermined stack of laminations. A retainer mechanism is provided for the dispenser for exerting pressure against the outer edge of at least one lamination adjacent the predetermined stack of laminations while the ejector moves the predetermined stack of laminations. The pressure is sufficient to secure at least the adjacent lamination in place. Preferably, the retainer mechanism simultaneously applies the pressure to both the first area and the second area of the adjacent lamination or laminations.

BRIEF DESCRIPTION OF THE DRAWINGS

The above-mentioned objectives and other features of this invention, as well as the manner of obtaining them, will become more apparent, and the invention itself will be best understood by reference to the following description of a preferred embodiment of the invention in conjunction with the drawings, in which.

DETAILED DESCRIPTION OF THE PRESENT INVENTION

Figure 1:
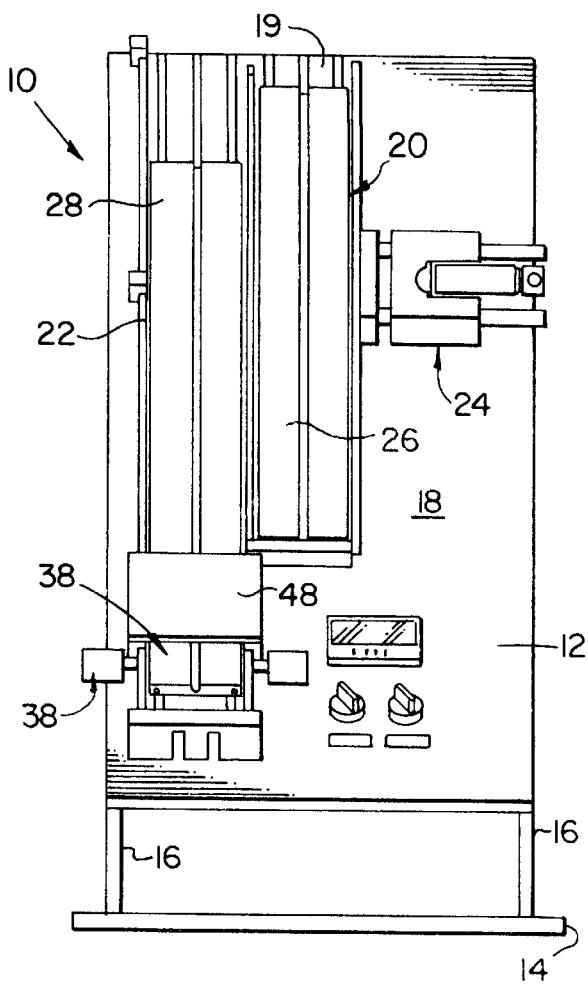
FIG. 1 is a front elevational view of a lamination dispenser in accordance with the principles of this invention.
Figure 2:
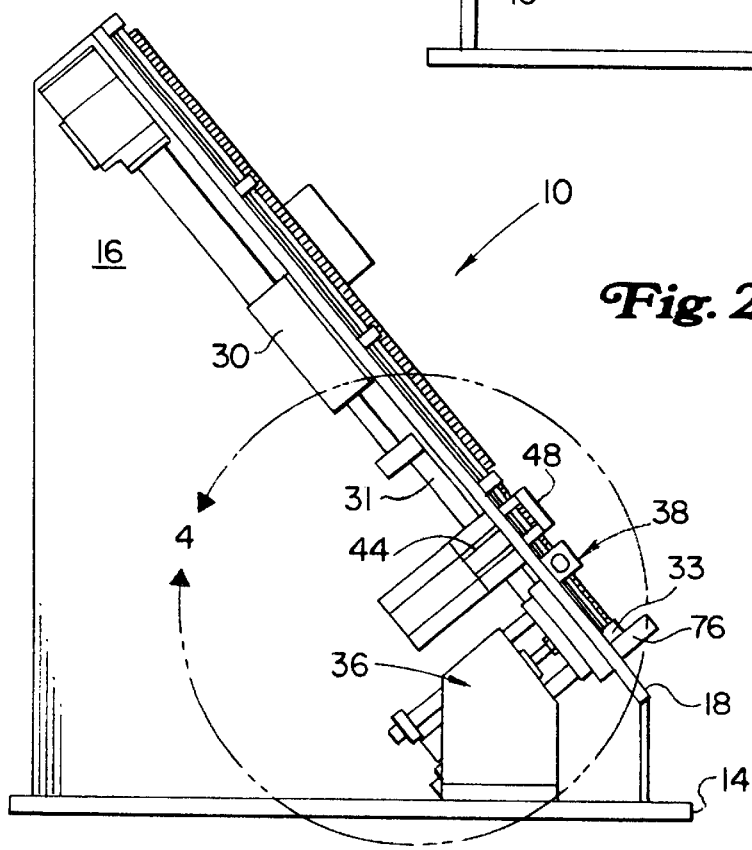
FIG. 2 is a side elevational view of a lamination dispenser in accordance with the present invention, wherein the near side panel of the cabinet has been removed in order to better illustrate the components located within the cabinet.

The above-listed objects are met or exceeded by the present lamination dispenser which has the following preferred configuration. Referring now to FIGS. 1–2, a lamination dispenser of the present invention is generally designated 10, and has a cabinet or stand 12 including a base 14, two side panels 16 and an inclined front panel 18 (best seen in FIG. 2). Side panels 16 are preferably made from sheet metal. Partially recessed within a cutout portion 19 of the inclined front panel 18 is a loading chute 20 and a dispensing chute 22. Also shown in FIG. 1 is a kick-over mechanism 24, which is used for moving a fill string of laminations 26 from the loading chute to the dispensing chute, as described more fully below.

Figure 10:
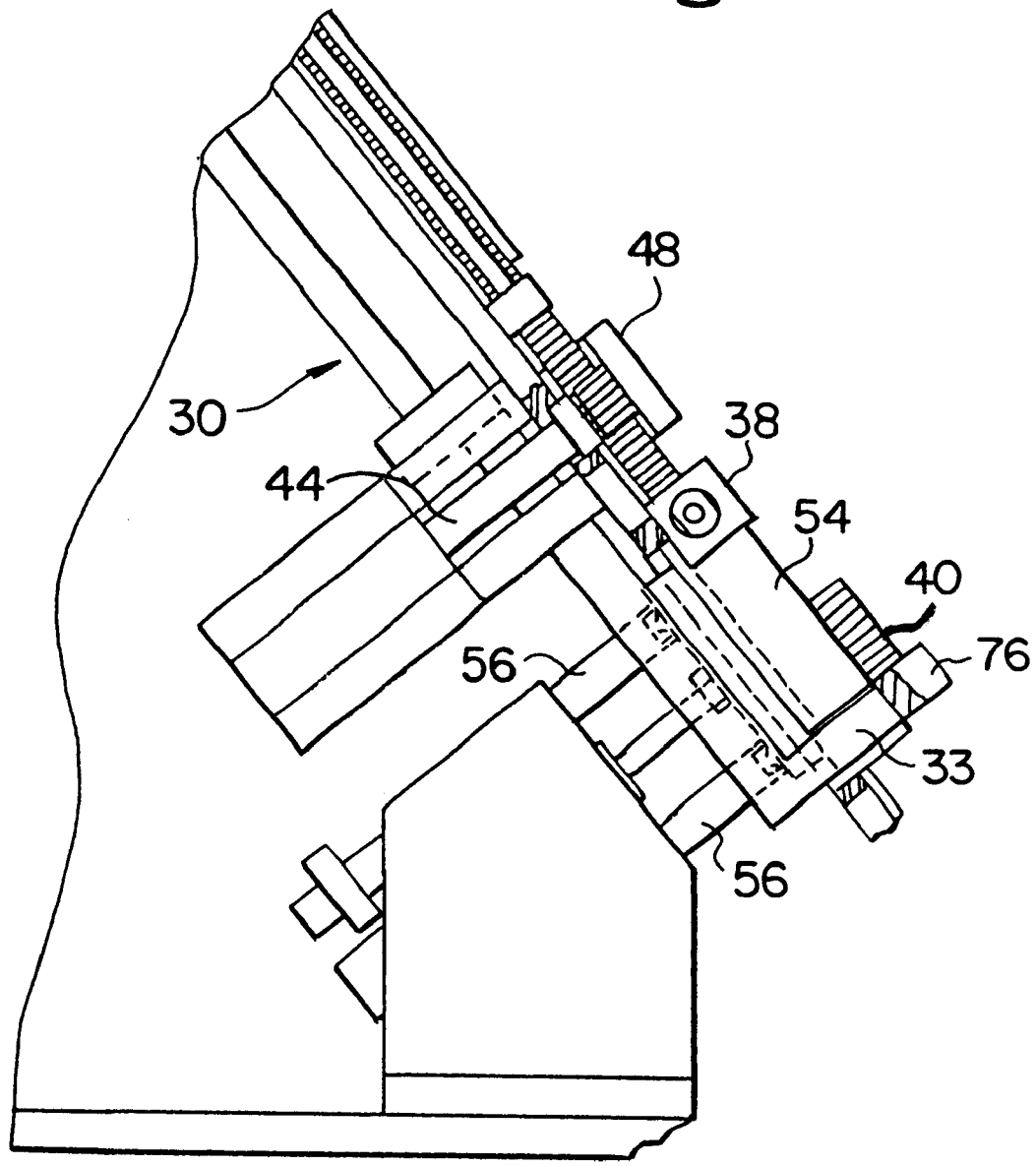
FIG. 10 is a view similar to FIG. 9, shown with the cut block moved extended outwardly into its final position.

A lamination elevator 30 (FIG. 2) is provided for lowering the string of laminations 28 which are seated in the dispensing chute 22. These laminations will be separated by the stack separation device 36, which, in cooperation with the lamination retainer assembly 38, dispense a predetermined amount of laminations into a dispensed stack 40 (shown in FIG. 10). The dispensed stack 40 of laminations may then be withdrawn either automatically or by the operator.

One example of a method of operation of the present invention will be described next. It should be noted that this description is but one example of the type of machine that may be used to employ the concepts of the present invention, and that variations in the methods of lamination transport, the design of the chutes, etc., are also considered as being within the scope of the invention, which scope should be determined by reviewing the appended claims.

Figure 3:
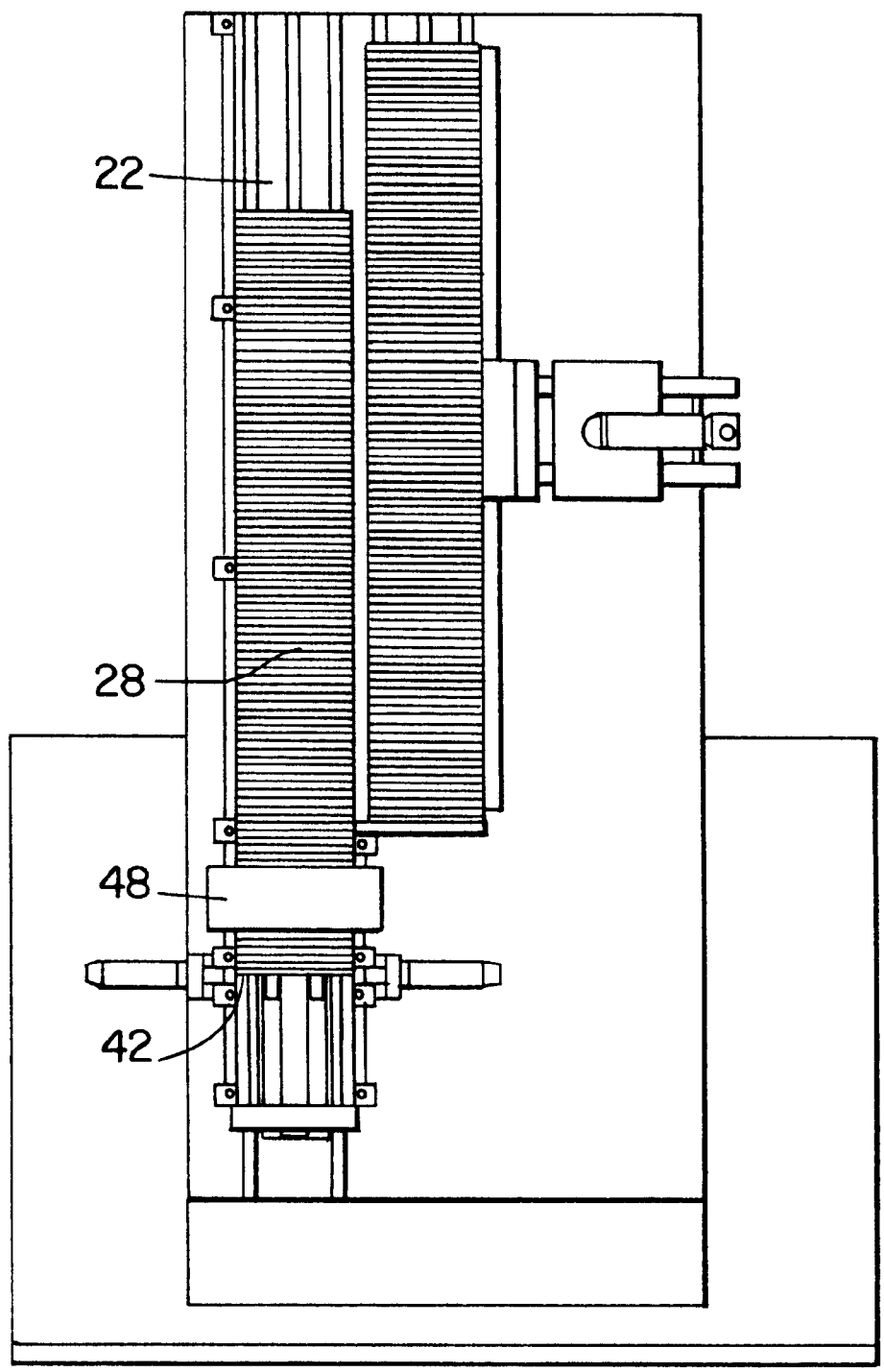
FIG. 3 is a front view of the device of FIGS. 1 and 2, shown with a full string of laminations in the start position.
Figure 4:
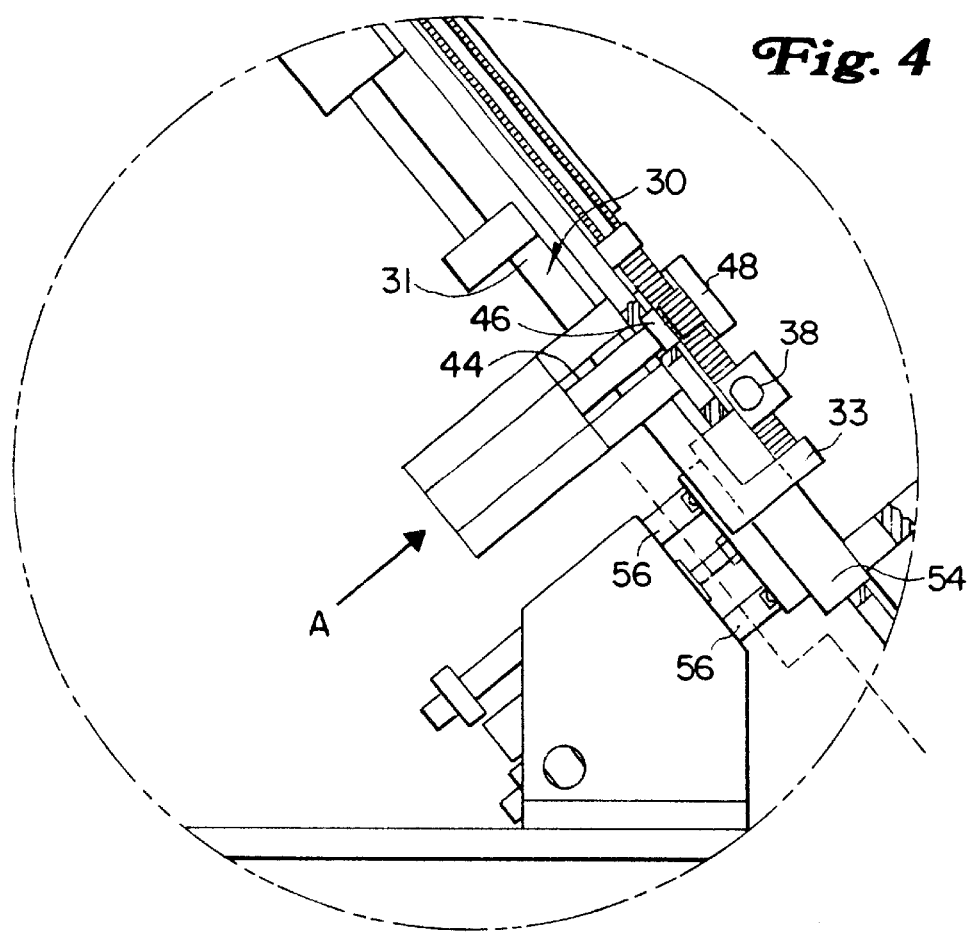
FIG. 4 is a simplified close-up view of the dispensing mechanism of the present invention, taken from the area encircled by the dashed line in FIG. 2.

In operation, the bottom 42 of the lamination string 28 is shown in FIG. 3 as being in the start position in dispensing chute 22. The lamination elevator 30, which preferably includes a L-shaped member with long leg 31 and short leg 33 (as shown in FIG. 4), then drops a stack that includes the required amount of laminations, plus an additional amount of lamination. The additional amount of lamination will be used for compressing the stack height. This additional amount is preferably of a height that is slightly less than the stack height. For example, if the stack height is two inches high, the additional amount of lamination is preferably one and one half inches high.

Referring now to FIG. 4, the string retaining cylinder 44 moves in the direction of arrow "A," forcing string retaining pad 46 against the laminations. This action forces a section of the laminations against string retaining plate 48, causing a "jam" that holds the remainder of the string of laminations back. Next, the lamination elevator 30 drops down a slight additional amount, such as 0.100 inches. This additional drop ensures that the tight jam between the laminations being pushed by string retaining pad 46 and the lamination elevator 30 is eliminated, resulting in a more true and accurate stack height since the stack is now unjammed. However, it should be noted that there is a slight compression that occurs from the additional lamination compressing upon the required stack height. However, this compression is minimal, and necessary for a consistent cut.

Figure 5:
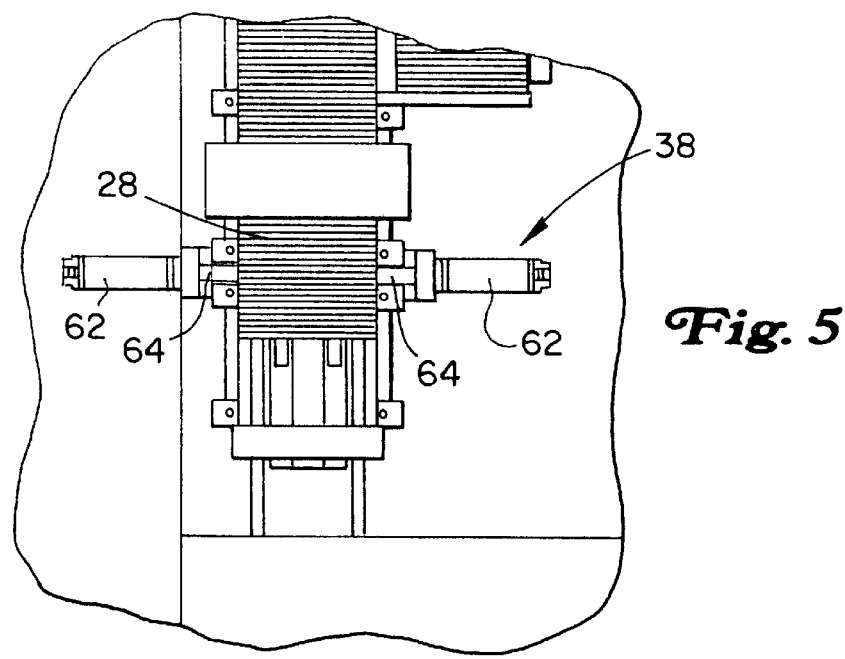
FIG. 5 is a close-up front view of the apparatus of FIG. 1.

Referring now to FIG. 5, the lamination retainer assembly 38 now comes into play at this stage of the operation. The lamination retainer assembly 38 includes a pair of lamination retainer cylinders 62 upon which are affixed a pair of retainer pads 64. Preferably the retainer pads are made of an elastomeric compound, such as urethane. The hardness of these retainer pads is preferably approximately 83 A Durometer.

Figure 6:
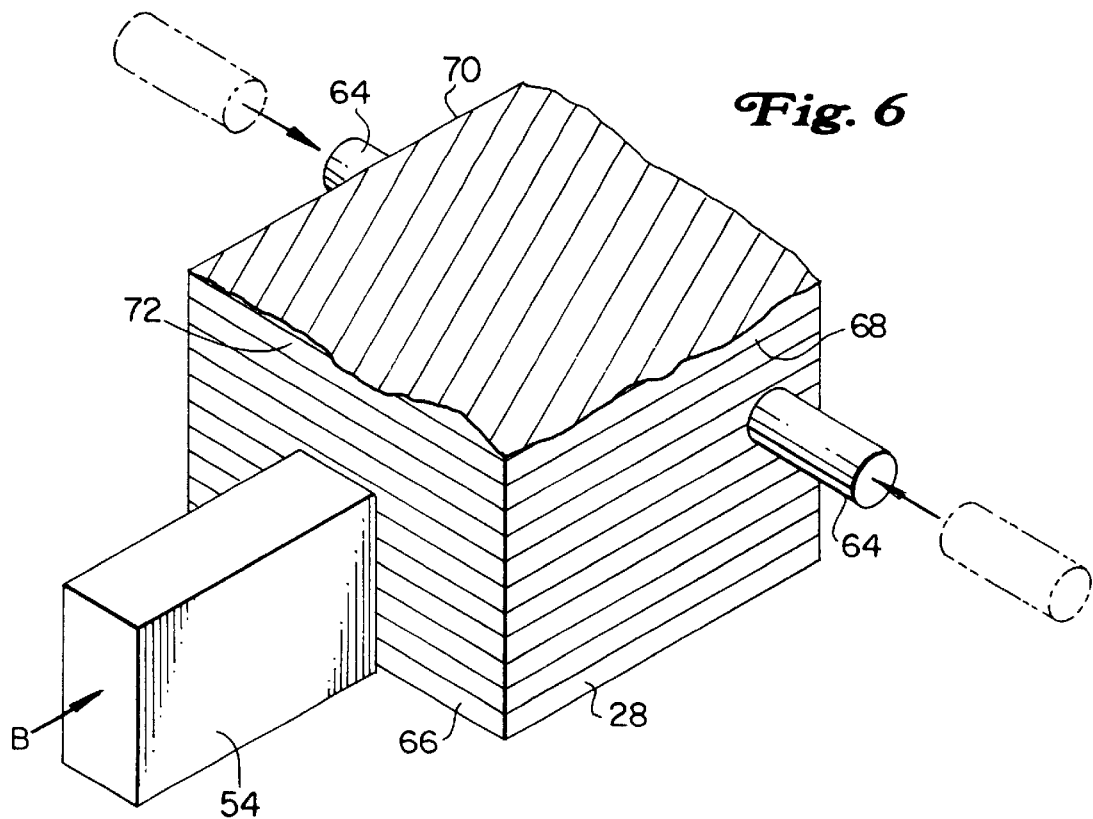
FIG. 6 is a simplified view of the lamination retainer of the present invention, shown prior to movement of a stack of laminations.
Figure 7:
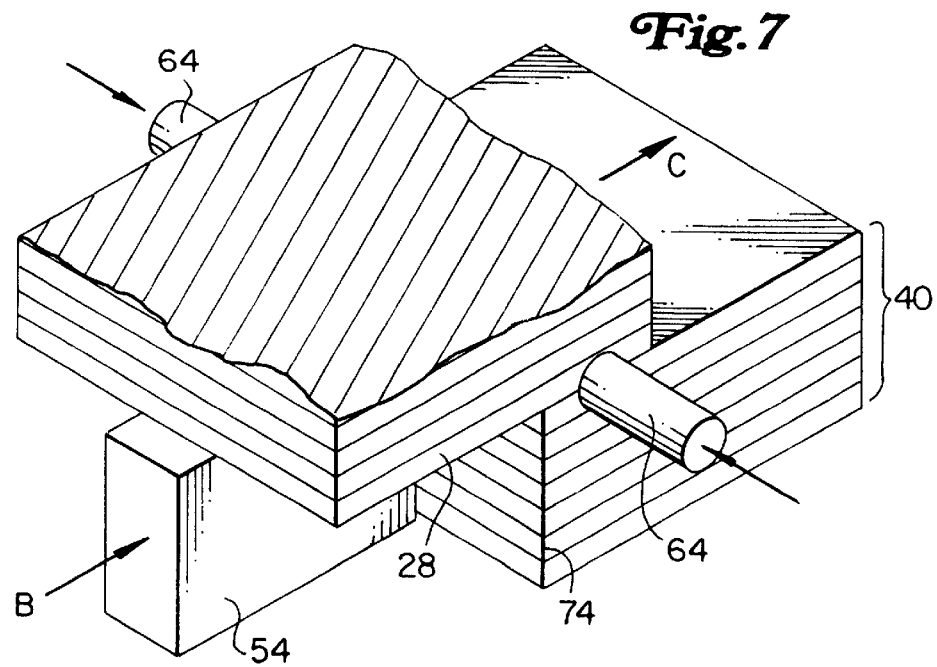
FIG. 7 is a view similar to FIG. 6, except shown during movement of a stack of laminations.

As the retainer assembly 38 is an important aspect of the present invention, FIGS. 6 and 7 have been provided to show, in a simplified form, how the retainer pads 64 maintain the laminations in proper alignment. FIG. 6 is a view of the laminations 28, which are situated within the dispensing chute 22 (FIG. 1), prior to being separated, and FIG. 7 is a similar view shown with the separation process in progress.

As shown in FIG. 6, each lamination 28 has an outer edge 66 that extends around the full periphery of the lamination. In the example shown, the laminations have been shown as being generally square for the sake of simplicity. However, all of the laminations in the stack may be of any one of a number of different shapes, such as E-shaped or I-shaped, as discussed above. For the sake of discussion, the outer edge 66 will be defined as including a first area 68 and a second area 70. The first area 68 and the second area 70 are on opposing sides from each other. The outer edge 66 also includes a third area 72, which is on the edge that extends perpendicular to the edges containing the first and second areas (68 and 70).

In order to keep the laminations from fanning out when a stack is removed from the remainder of the string of laminations, the retainer pads 64 apply pressure to opposing sides of the laminations at the first and second areas (68 and 70). Next, the cut block 54 begins to apply a force in the direction of arrow "B" to the third area 72 of the stack of laminations. It should be noted that the pressure applied to the pads 64 should be sufficient to retain laminations above the cutting block 54 in place, while still permitting the laminations at the level of the cutting block to be moved by the cutting block.

As shown in FIG. 7, the force applied by cut block 54 separates the stack of laminations 40 from the remainder of the amount of lams for compression 28 (i.e., the stack of laminations 40 is moved in the direction of arrow "C"). During this step, the retainer pads 64 keep the amount of lams for compression in place so that they do not fan out in the direction of arrow "C". The pads 64 also keep the laminations from becoming misaligned on their sides also.

Preferably, the center of the pads 64 is located at the point in the lamination where the stack 40 is being separated from amount of lams for compression. Thus, as shown in FIG. 7, approximately half of the pad is located on the separated stack 40 and the other half is located on the remaining laminations for compression. Accordingly, each pad will contact at least one lamination that is remaining and at least one moving lamination, depending on gauge thickness. Additionally, although generally cylindrical pads 64 are shown in FIGS. 6 and 7, it is contemplated that pads of other shapes, such as brick-shaped or otherwise generally rectangular, cylinders with oval cross-section, etc., may also be used.

Figure 8:
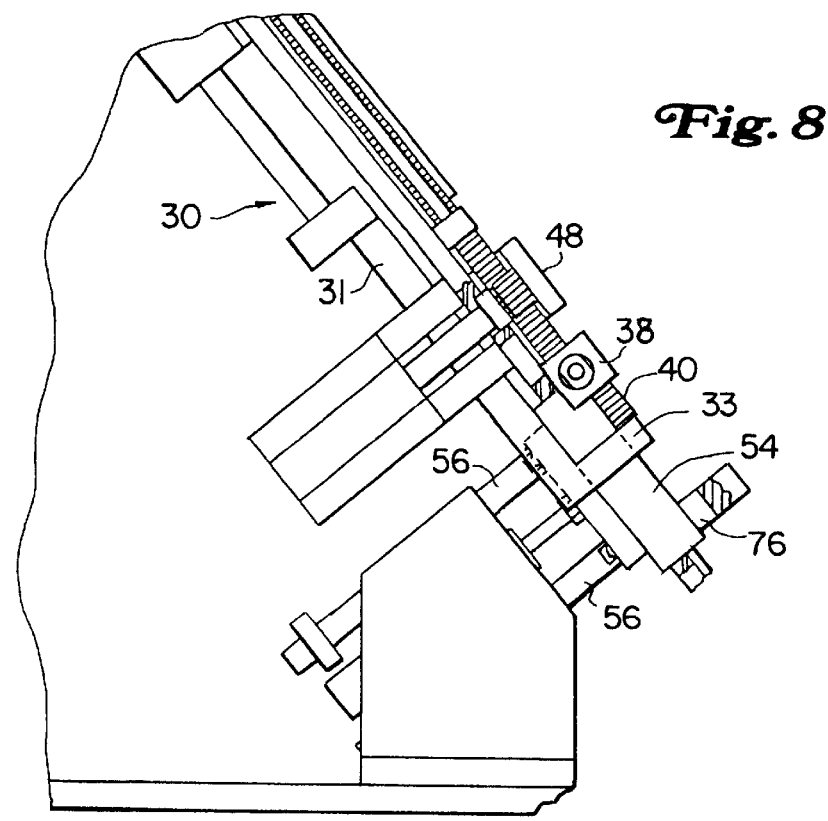
FIG. 8 is a view similar to FIG. 4, shown with the cut block slightly extended outwardly to its first position.

Referring now to FIG. 8, the next step of the process will be described. In this step a stack separation cylinder 15 is used to move the cut block 54 slightly outwardly (to the right, as shown in FIG. 8). Preferably, cylinder 15 is a multiple position cylinder, and FIG. 8 depicts the cylinder at its first position. During this step, the required height for the dispensed stack of laminations 40 is acquired since the upper portion of the cut block 54 holds back the stack of laminations above the dispensed stack 40. That is, the cut block 54 holds back the stack which, as described above, was being used to compress the laminations in the dispensed stack 40 prior to being dispensed.

In order to eliminate undue wear from the retainer pads 64 contacting the laminations 28 (best seen in FIGS. 5–7), at this point the retainer pads 64 are moved away from the laminations so that they are no longer in contact with them. Such undue wear can occur where the trailing edge of the laminations cuts into the retainer pads 64 when the stack 40 are moved outwardly. More specifically, such undue wear is prevented by having the lamination retainer cylinders 62, best seen in FIG. 5, move outwardly so that the retainer pads 64 are out of contact with stack 40.

Figure 9:
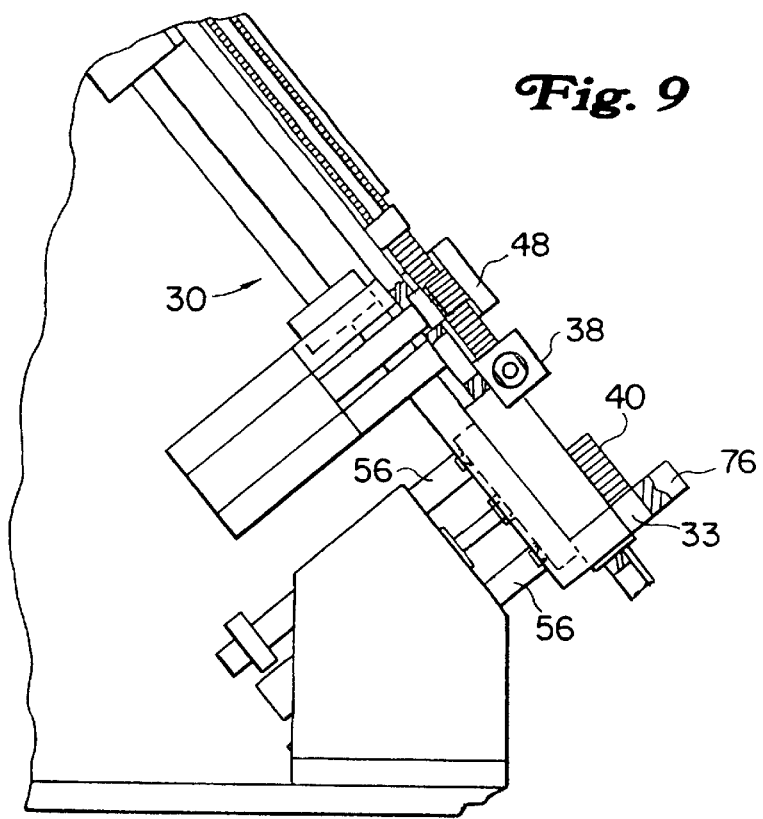
FIG. 9 is a view similar to that of FIG. 4, shown with the stack of laminations seated on the capture block.

As shown in FIG. 9, now that the required amount of laminations is located in stack 40, the lamination elevator 30 is moved downwardly, and with it the dispensed stack of laminations 40 comes to rest on an eject and capture block 76. Next, the cut block 54 is moved forward into its final position, shown in FIG. 10, via the movement of the stack separation cylinder 56 (which is a multiple position cylinder) into its second and final position. This movement pushes the lamination stack 40 to its final position (or capture position), where it can be removed from the lamination dispenser machine 10 either manually by the operator or automatically by another machine.

The process then continues by performing the following steps that reset the machine so that the next lamination stack may be separated and removed from the machine. First, the lamination elevator 30 moves upwardly to its start position, where it retains the stack of laminations used for compressing the stack 40. The original stack 40 has now been removed from the machine (or has at least been separated from the compressing stack, and is still sitting on the eject and capture block 76). Next, the cut block 54 moves back to its retracted position. Additionally, the string retaining cylinder 44 and its pad 46 are also moved back to their retracted position, which permits the lamination elevator 30 to once again bear the entire load of the string of laminations.

Figure 11:
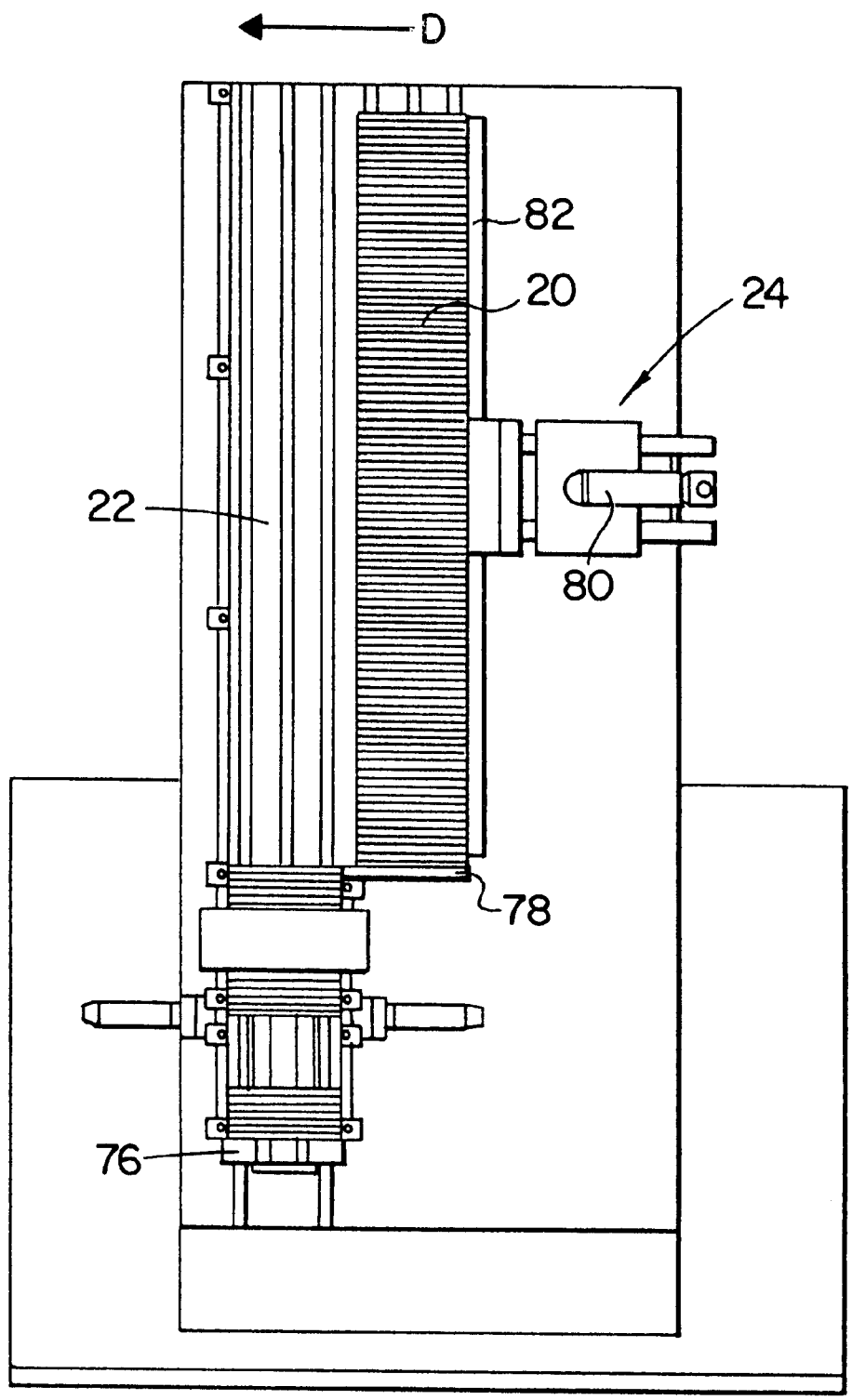
FIG. 11 is a front view of the present invention, showing a new string of lamination about to be moved from the loading chute to the dispensing chute.

The process of separating stacks of laminations continues until finally, as shown in FIG. 11, the top of the lamination string in the dispensing chute 22 is at the same height as the top of string rest plate 78. At this point, the kick over cylinder 80 (of the kick over mechanism 24) moves the push plate 82 in the direction of arrow "D" so that a new string of laminations can be moved from the loading chute 20 to the dispensing chute 22. Then, once the new string of laminations is moved, the lamination separation process continues by repeating the steps discussed above.

While various embodiments of the present invention have been described, it should be understood that other modifications, substitutions and alternatives may be apparent to one of ordinary skill in the art. Such modifications, substitutions and alternatives can be made without departing from the spirit and scope of the invention, which should be determined from the appended claims.

What is claimed is:

1. A lamination dispenser for dispensing a predetermined stack of laminations from a string of laminations, each lamination having an outer edge with a first area of the outer edge opposing a second area of the outer edge, and a third area of the outer edge perpendicular to the first and second areas of the outer edge, comprising:
    a separator for removing the predetermined stack of laminations from said string by pressing against said third areas of said predetermined stack of laminations; and
    a retainer mechanism exerting pressure against said outer edge of at least one lamination adjacent said predetermined stack of laminations while said separator moves said predetermined stack of laminations, said pressure being sufficient to secure at least said adjacent lamination in place,
    wherein said retainer mechanism simultaneously applies said pressure to both said first and second areas of said adjacent lamination, and
    said retainer mechanism further includes two opposing retractable fingers for exerting said pressure, said retractable fingers including a first finger abutting said first area and a second finger abutting said second area.

2. The lamination dispenser of claim 1, wherein said retainer mechanism applies said pressure centered at the juncture of said outer edge of said adjacent lamination and an outer edge of a lamination of said predetermined stack of laminations that abuts said adjacent lamination.

3. The lamination dispenser of claim 1, wherein said separator is an axially movable cut block that has an end for abutting said third areas of said predetermined stack of laminations and is movably attached to an actuator, said cut block being configured and arranged for moving said predetermined stack of laminations away from said adjacent lamination.

4. A method of dispensing a predetermined stack of laminations from a string of laminations, each lamination having an outer edge with a first area of the outer edge opposing a second area of the outer edge, and a third area of the outer edge perpendicular to the first and second areas of the outer edge, comprising:
    removing the predetermined stack of laminations from said string by pressing against said third areas of said predetermined stack of laminations; and
    exerting pressure against said outer edge of at least one lamination adjacent said predetermined stack of laminations while removing said predetermined stack of laminations, said pressure being sufficient to at least secure said adjacent lamination in place,
    wherein said step of exerting pressure further includes simultaneously applying said pressure to both said first and second areas of said adjacent lamination, and
    said step of exerting pressure further includes applying pressure by moving two opposing retractable fingers toward said adjacent lamination and said predetermined stack of laminations for exerting said pressure, including abutting a first finger against said first area and abutting a second finger against said second area.

5. The method according to claim 4, wherein said step of exerting pressure further includes exerting said pressure so that it is centered at the juncture of said outer edge of said adjacent lamination and an outer edge of a lamination of said predetermined stack of laminations that abuts said adjacent lamination.

6. The method according to claim 4, wherein said step of exerting pressure further includes applying said pressure only on said outer edges of said adjacent lamination and an outer edge of a lamination of said predetermined stack of laminations that abuts said adjacent lamination.

7. The method according to claim 4, wherein said step of removing further includes moving a pressing arm axially, pressing against said third areas of said predetermined stack of laminations and sliding said predetermined stack of laminations away from said adjacent lamination.

* * * * *